May 14, 1929.  J. KUBLER  1,712,569
RECTIFIER SYSTEM
Original Filed Aug. 31, 1921
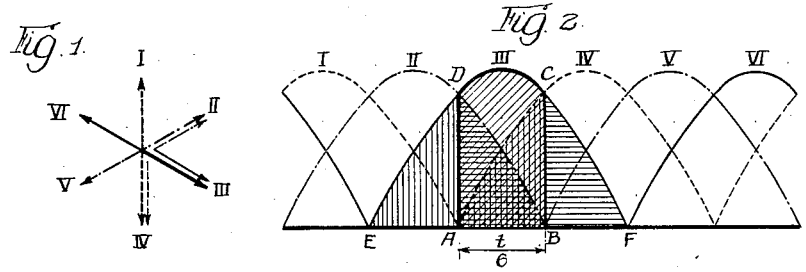
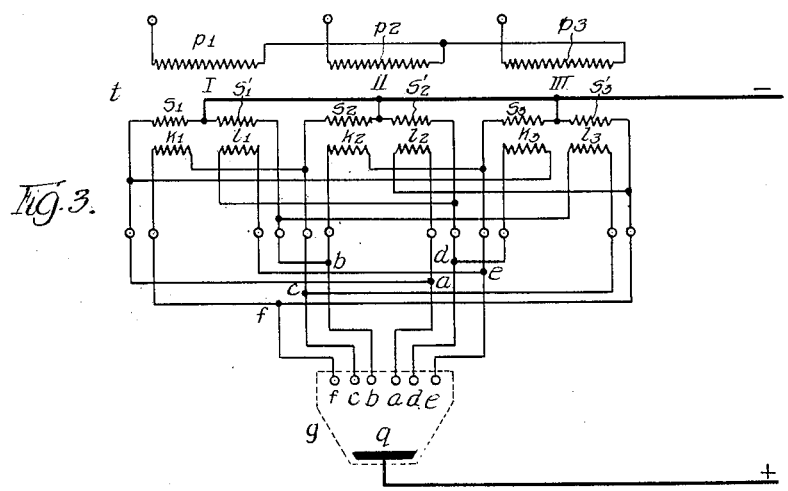

Patented May 14, 1929.

1,712,569

UNITED STATES PATENT OFFICE.

JOHANN KÜBLER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

RECTIFIER SYSTEM.

Original application filed August 31, 1921, Serial No. 497,431, and in Germany May 18, 1916. Divided and this application filed June 3, 1927. Serial No. 196,289.

This invention relates to rectifier systems, and it is a division of my co-pending application Serial No. 497,431, filed August 31, 1921.

Among the objects of the invention is a rectifier system wherein a polyphase rectifier is combined with a special type of polyphase supply transformer so co-operating with each other as to secure better utilization of the transformer and rectifier phases; a reduction of the harmonic currents flowing into the alternating current net work incident to the rectification; and better and more efficient regulation of the direct current voltage derived from the rectifier.

The foregoing and other objects will be best understood from the accompanying drawings, wherein Fig. 1 is a vector diagram representing symbolically a six-phase alternating current system;

Fig. 2 is a curve diagram illustrating the current flow conditions in a six-phase rectifier; and Fig. 3 is a diagrammatic view of a rectifier system embodying one form of the invention.

In metallic-vapour or similar rectifiers comprising a plurality of anodes, it is well known that at any one time only that anode or anode group carries current whose potential is higher than the potential of all the other anodes. Consequently in rectifiers fed with polyphase current the time during which the current is carried per alternating current period by each anode is inversely proportional to the number of phases, that is to say, if the rectifier for example is fed with three-phase current, the time during which the current is carried will be equal to the third part of a period, and if the rectifier is fed with six-phase current, the time during which current is carried will be equal to the sixth part of a period. The result of this is that the feeding transformers are inefficiently utilized, and higher harmonics are induced in their primaries which in some cases may have an injurious action upon the feeding net, unless special measures are taken to prevent the entrance of such waves into the primary net.

According to this invention the positive half of a voltage curve which does not differ too much from sine form is being utilized in its full extent in the following manner: At any given moment, a part of that phase winding which carries current is made to co-operate with a combination of parts of other phase windings. This combination of parts may be connected to the aforesaid part either in series or in parallel. In the latter case the result obtained by superposition of the individual voltage curves of each element will be a voltage curve coinciding with that produced by the first-mentioned part.

The manner in which the combining of the portions of the winding may be effected will now be explained with reference to the example of a parallel connection of the portions of the winding when the rectifier is fed with six-phase current. To the six vectors I–VI of Figure 1 there correspond the six current curves I–VI shown in Figure 2, of which I and IV are shown in dotted lines, II and V are shown in dash and dot lines, and III and VI are shown in full lines. In the ordinary mode of connection each anode, and therefore each secondary transformer winding phase, would carry current only during the sixth part of a period, $AB = \frac{t}{6}$, and during this time the voltage of this anode is greater than that of the remaining anodes.

In Figure 2 the curve of the current of phase III is shown in full lines and the area ABCD which is enclosed by the current curve is shown hatched with slanting lines. It is however known that in a sine curve the summation of the ordinates of the part areas ABC (hatched with vertical lines) and BAD (hatched with horizontal lines) of the adjacent sine curves IV and II will produce the same part area ABCD of the sine curve III. Therefore in Figure 1 the vector III can also be obtained by the geometrical addition of the vectors II and IV, and vector II can be obtained by the addition of vectors I and III, etc. Now if the case of a rectifier is considered from this point of view, then it will be possible to allow three portions (instead of only one portion) of the winding of the feeding transformer to carry current simultaneously at any time, or which is the same, to utilize the whole of the positive portion of a sine curve instead of only its middle third. Namely, since this process is applied successively to all the phases of the winding, the phase III for example will carry current not only during the time AB (Figure 2), but also previously during the time EA it will carry the current ED (vertical hatching), and afterwards during the time BF it will carry the current CF (horizontal hatching).

The utilization of zigzag or interconnected transformer windings for supplying polyphase rectifiers has an additional beneficial effect in improving the voltage regulation of the direct current output of the rectifier. As is known, polyphase rectifiers that are supplied by means of polyphase transformers having straight phase windings show a large variation, of approximately 16%, of the direct current output voltage between the no-load and the full load condition. To overcome this deficiency interphase transformers have been used in connection with such rectifiers. The latter give a substantially flat voltage regulation curve for the major portion of the load range, the voltage varying only about 4% to 5% from about 1.5% to full load.

The disadvantage of the systems utilizing interphase transformers or absorption coils resides in the fact that if the load drops below 1.5% full load, the output voltage rises rapidly about 10%, which is not permissible in most of the applications where direct current is utilized. Polyphase rectifiers wherein a plurality of rectifying elements that are connected in star are supplied with alternating current from a transformer, the secondary phases of which are connected in zigzag, or, in general, composed of interconnected winding elements induced by two different primary phases, show a flat voltage characteristic throughout the entire load range from no-load up to full load. That is, the voltage between the output terminals of the rectifier varies only about 5% while varying the load from zero to full value, thus obviating the difficulties residing in rectifier systems of the prior art, either with or without absorption coils.

Referring now to Fig. 3, the secondary windings of the transformer comprise a plurality of phase winding elements $k_1$, $k'_1$, $k_2$, $l_2$, $k_3$ and $l_3$, of the primary or basal phases, connected in mesh into a closed polygon, with a set of similar winding elements $s_1$, $s'_1$, $s_2$, $s'_2$, $s_3$ and $s'_3$ connected in star, and interconnecting diagonally the corners of the polygon. Or, expressing it differently, a set of star-connected phase windings has the star end terminals interconnected by an additional set of windings of suitable phase.

Each of the anodes $a$, $b$, $c$, etc., has three parallel paths through which current is supplied thereto from the transformer. For instance, anode $a$ has one supply path through the star winding $s_1$, a second path through the star winding $s'_2$ in series with the mesh winding $k_3$, and a third path through the star winding $s'_3$ in series with the mesh winding $l_2$.

This system of rectifier connections, it will be seen employs interconnected phase windings for supplying the phases of the rectifier and gives a flat voltage regulation.

I claim as my invention:

1. The combination of a polyphase rectifier and a transformer for supplying said rectifier comprising a secondary winding having a plurality of phase winding elements connected in mesh into a closed polygon and additional phase winding elements interconnected diagonally in star between the corners of said polygon, the star point constituting one direct-current terminal.

2. In a rectifier installation, the combination of a polyphase rectifier having a plurality of star-connected rectifying elements, a polyphase transformer for supplying said elements, said transformer having a plurality of primary phase windings of a relatively low number of phases, and a secondary polyphase winding of greater phase number than said primary winding connected to the phases of said rectifier, said secondary winding comprising a plurality of star-connected winding elements of the primary phases, and additional winding elements of the primary phases interconnecting the end terminals of said star-connected winding elements.

3. The combination with a polyphase rectifier or transformer for supplying said rectifier, said transformer comprising a plurality of primary windings of a relatively low number of phases and a secondary polyphase winding of a relatively larger phase number, said secondary winding comprising a plurality of winding elements of the primary phases connected into a star polyphase system, the end terminals of said star-connected winding elements being connected to the terminals of said polyphase rectifier, and additional winding elements of the primary phases interconnecting said end terminals.

4. The combination of a three-phase line and a rectifier having a phase number which is a multiple of three, of a transformer for supplying said rectifier from said line, said transformer comprising a three-phase primary winding, and a secondary winding corresponding in phase number to said rectifier, said secondary winding comprising a plurality of star-connected winding elements of the primary phases, and additional winding elements of the primary phases interconnecting the end points of said star-connected winding elements.

5. In a rectifier installation, the combination of a polyphase rectifier having a plurality of star-connected rectifying elements, a polyphase transformer for supplying said elements, said transformer having a plurality of primary phase windings, and a secondary polyphase winding connected to the phases of said rectifier, said secondary winding comprising a plurality of star-connected winding elements of the primary phases, and additional winding elements of the primary phases interconnecting the end terminals of said star-connected winding elements.

6. The combination with a polyphase rectifier or transformer for supplying said rectifier, said transformer comprising a plurality of primary windings and a secondary polyphase winding, said secondary winding comprising a plurality of winding elements of the primary phases connected into a star polyphase system, the end terminals of said star-connected winding elements being connected to the terminals of said polyphase rectifier, and additional winding elements of the primary phases interconnecting said end terminals.

7. A method of utilizing the full extent of the positive half of the voltage curve in rectifiers fed with polyphase transformers which consists in energizing the temporarily active rectifying phase with power from the associated main phase winding and also with power from a combination of series-connected windings of other phases wherein the temporarily active phase comprises a single anode and wherein both the main phase winding and the combination of series-connected windings are connected in parallel to such anode.

8. The combination of a polyphase rectifier and a transformer for supplying said rectifier comprising a secondary winding having a plurality of phase winding elements connected in mesh into a closed polygon and additional phase winding elements interconnected diagonally in star between the corners of said polygon, the star point constituting one direct-current terminal.

9. In a rectifier installation, the combination of a polyphase rectifier having a plurality of star-connected rectifying elements, a polyphase transformer for supplying said elements, said transformer having a plurality of primary phase windings of a relatively low number of phases, and a secondary polyphase winding of greater phase number than said primary winding connected to the phases of said rectifier, said secondary winding comprising a plurality of star-connected winding elements of the primary phases, and additional winding elements of the primary phases interconnecting the end terminals of said star-connected winding elements.

10. The combination with a polyphase rectifier, of a transformer for supplying said rectifier, said transformer comprising a plurality of primary windings of a relatively low number of phases and a secondary polyphase winding of a relatively larger phase number, said secondary winding comprising a plurality of winding elements of the primary phases connected into a star polyphase system, the end terminals of said star-connected winding elements being connected to the terminals of said polyphase rectifier, and additional winding elements of the primary phases interconnecting said end terminals.

11. The combination of a three-phase line and a rectifier having a phase number which is a multiple of three, of a transformer for supplying said rectifier from said line, said transformer comprising a three-phase primary winding, and a secondary winding corresponding in phase number to said rectifier, said secondary winding comprising a plurality of star-connected winding elements of the primary phases, and additional winding elements of the primary phases interconnecting the end points of said star-connected winding elements.

12. In a system of the character described, a polyphase supply line, rectifying apparatus having a plurality of anodes, and transformer means providing an operating connection between said line and said apparatus and including primary winding means providing primary phases equal in number to the number of phases of said line and secondary winding means providing secondary phases equal in number to the number of said anodes, said secondary winding means including winding elements associated respectively with the primary phases and connected in series with each other to form a closed polygon, certain of said anodes being connected to such polygon.

13. In a system of the character described, a polyphase supply line, rectifying apparatus having a plurality of anodes, and transformer means providing an operating connection between said line and said apparatus and including primary winding means providing primary phases equal in number to the number of phases of said line and secondary winding means providing secondary phases equal in number to the number of said anodes, said secondary winding means including winding elements connected to form closed polygons equal in number to the number of said anodes and wherein each winding element forming part of any polygon is associated with a primary phase different than the respective primary phases with which the other winding elements forming the remaining part of said polygon are associated, said polygons being connected respectively to said anodes.

14. In a system of the character described, a polyphase supply line, rectifying apparatus having a plurality of anodes, and transformer means providing an operating connection between said line and said apparatus and including primary winding means providing primary phases equal in number to the number of phases of said line and secondary winding means providing secondary phases equal in number to the number of said anodes, said secondary winding means including star-connected winding elements each associated with one of said primary phases and additional winding elements connecting the free ends of said star-connected winding elements, each additional winding element being associated with a primary phase different than the respective primary phases with which the winding elements it connects are associated.

15. In a rectifying system, a polyphase supply line, rectifier apparatus having anodes greater in number than the number of phases of said line, and transformer means providing an operative connection betwen said line and said apparatus and comprising primary winding means connected to said line and providing phases of number equal to the number of phases of said line and secondary winding means having a neutral point and providing rectifier supply phases, a winding element forming part of said secondary winding means and being connected to said neutral point and being common with respect to adjacent rectifier supply phases, other winding elements each forming part of said secondary winding means and each being connected to said first-mentioned winding element and to certain of said anodes, each of said winding elements being associated with a primary phase different than that with which the others are associated.

16. In a rectifying system, a polyphase supply line, rectifying apparatus having anodes greater in number than the number of phases of said line; and transformer apparatus providing an operating connection between said line and said rectifying apparatus and including primary winding elements equal in number to and connected to the respective phases of said line, a plurality of secondary winding elements each common to a plurality of said anodes, and additional secondary winding elements, certain of said additional secondary winding elements being connected to certain of said anodes and to certain of said first-named secondary winding elements.

17. In a rectifying system, a polyphase supply line, rectifying apparatus having anodes greater in number than the number of phases of said line; and transformer apparatus providing an operating connection between said line and said rectifying apparatus and including primary winding elements equal in number to and connected to the respective phases of said line, a plurality of secondary winding elements each common to a plurality of said anodes, and additional secondary winding elements, certain of said additional secondary winding elements being connected to certain of said anodes and to certain of said first-named secondary winding elements and being associated with different primary phases.

18. In a rectifying system, a polyphase supply line, rectifier apparatus having anodes, and transformer means excited from said line and providing supply phases for said anodes; said transformer means including a winding element common with respect to certain of said supply phases, a second winding element cooperating with said first-mentioned winding element to provide one of said certain supply phases, and a third winding element cooperating with said first-mentioned winding element to provide another of said certain supply phases.

19. In a rectifying system, a polyphase supply line, rectifier apparatus having anodes, transformer means excited from said line and including polyphase primary winding means and secondary winding means providing supply phases for said anodes, a winding element forming part of said secondary winding means and being common with respect to certain of said supply phases, a second winding element forming part of said secondary winding means and cooperating with said first-mentioned winding element to provide one of said certain supply phases, and a third winding element forming part of said secondary winding means and cooperating with said first-mentioned winding element to provide another of said certain supply phases, each of said winding elements being associated with a primary phase different than the primary phases with which the others are associated.

In testimony whereof I have hereunto subscribed my name this 10th day of May A. D. 1927, at Zurich, Switzerland.

JOHANN KÜBLER.